(12) United States Patent
Yamada et al.

(10) Patent No.: US 7,299,032 B2
(45) Date of Patent: Nov. 20, 2007

(54) COMMUNICATION TERMINAL AND PROGRAM

(75) Inventors: Kazuhiro Yamada, Yokohama (JP); Yoshiaki Hiramatsu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 23 days.

(21) Appl. No.: 11/009,892

(22) Filed: Dec. 10, 2004

(65) Prior Publication Data

US 2005/0128974 A1 Jun. 16, 2005

(30) Foreign Application Priority Data

Dec. 10, 2003 (JP) ............................. 2003-412431

(51) Int. Cl.
 *H04M 1/725* (2006.01)
 *H04M 7/22* (2006.01)
 *G06F 15/16* (2006.01)

(52) U.S. Cl. .............................. 455/412.1; 455/412.2; 455/414.2; 709/200

(58) Field of Classification Search ................ 455/415, 455/31.1, 412.1, 412.2, 414.2; 379/215.01; 370/329; 709/200
 See application file for complete search history.

(56) References Cited

U.S. PATENT DOCUMENTS 5,930,700 A * 7/1999 Pepper et al. ............ 455/435.3
6,519,335 B1 * 2/2003 Bushnell ................. 379/215.01
6,584,490 B1 * 6/2003 Schuster et al. ............ 709/200
7,046,643 B1 * 5/2006 Zellner et al. .............. 370/329

FOREIGN PATENT DOCUMENTS

| EP | 1 484 688 A1 | 12/2004 |
| JP | 2001-211478 A | 8/2001 |
| WO | WO 97/20423 A1 | 6/1997 |
| WO | WO 01/80535 A1 | 10/2001 |
| WO | WO 02/17603 A1 | 2/2002 |
| WO | WO 03/071433 A1 | 8/2003 |

* cited by examiner

*Primary Examiner*—Jean Gelin
*Assistant Examiner*—Kiet Doan
(74) *Attorney, Agent, or Firm*—Brinks Hofer Gilson & Lione

(57) ABSTRACT

If an e-mail is sent to a user of a communication terminal while the communication terminal is being used for voice communication, informing the user that the e-mail has been sent is controlled. Mobile phone 500 stores an importance level in association with a telephone number and e-mail address. If a mail alert is received while mobile phone 500 is used for voice communication, an importance level of the voice communication partner and an importance level of the sender of the e-mail are read from a nonvolatile memory. The read importance levels are compared by mobile phone 500, and if the importance level of the sender of the e-mail is higher, mobile phone 500 informs the user thereof that it has received the mail alert.

27 Claims, 10 Drawing Sheets

FIG. 2

| SUBSCRIBER NAME | TERMINAL IDENTIFIER | TELEPHONE NUMBER | E-MAIL ADDRESS | ADDRESS |
|---|---|---|---|---|
| ICHIRO SATO | MS0001 | 0*0-1111-2222 | ichiro@abc.co.jp | ***, CHUO-KU, TOKYO |
| JIRO SUZUKI | MS0002 | 0*0-3333-4444 | jiro@abc.co.jp | ***, CHIYODA-KU, TOKYO |
| SABURO TANAKA | MS0003 | 0*0-5555-6666 | saburo@abc.co.jp | ***, CHIBA-SHI, CHIBA |

FIG. 6

| | F1 | F2 | F3 | F4 |
|---|---|---|---|---|
| | NAME | TELEPHONE NUMBER | E-MAIL ADDRESS | IMPORTANCE |
| | SHIRO TAKAHASHI | — | shiro@xyz.co.jp | 5 |
| | JIRO SUZUKI | 0*0-3333-4444 | jiro@abc.co.jp | 3 |
| | SABURO TANAKA | 0*0-5555-6666 | saburo@abc.co.jp | 4 |

*FIG.11*

| NAME | TELEPHONE NUMBER | E-MAIL ADDRESS | TIME PERIOD | IMPORTANCE |
|---|---|---|---|---|
| SHIRO TAKAHASHI | — | shiro@xyz.co.jp | 7:00-8:59 | 1 |
| | | | 9:00-19:59 | 5 |
| | | | 20:00-6:59 | 2 |
| JIRO SUZUKI | 0*0-3333-4444 | jiro@abc.co.jp | 6:00-9:59 | 3 |
| | | | 10:00-18:29 | 3 |
| | | | 18:30-5:59 | 5 |

FIG. 12

| NAME | TELEPHONE NUMBER | E-MAIL ADDRESS | LOCATION | IMPORTANCE |
|---|---|---|---|---|
| SHIRO TAKAHASHI | — | shiro@xyz.co.jp | OFFICE | 1 |
| | | | HOME | 5 |
| | | | A STATION | 2 |
| JIRO SUZUKI | 0*0-3333-4444 | jiro@abc.co.jp | OFFICE | 3 |
| | | | **PARK | 3 |
| | | | HOME | 5 |

COMMUNICATION TERMINAL AND PROGRAM

This application claims priority under 35 U.S.C. § 119 to Japanese Patent Application No. 2003-412431 filed Dec. 10, 2003, the entire content of which is hereby incorporated by reference.

TECHNICAL FIELD

The present invention relates to a technique for informing a user of a communication terminal of reception of an e-mail.

BACKGROUND ART

A mobile communication network using IMT-2000 (International Mobile Telecommunication 2000) can provide a communication service known as a multi-call service, which enables a user of a mobile phone to simultaneously use a voice communication service and a data communication service. Accordingly, by using a mobile phone which complies with IMT-2000 and which is capable of using the multi-call service, a user can receive e-mails or browse a variety of contents by use of a WWW (World Wide Web) browser during voice communication.

When it becomes possible to perform data communication during voice communication, a user of a mobile phone can receive a mail alert indicating reception of an e-mail during voice communication, to inform the user that an e-mail has been stored in a mailbox for storing e-mails addressed to the user. On receipt of the mail alert, a mobile phone informs a user thereof that it has received an e-mail; for example, by a ring alert or a vibration.

However, if a mobile phone is set to provide a user with a mail alert, voice communication can be undesirably interrupted by the alert.

As a means of solving the foregoing described problem, Japanese Patent Application Laid-Open Publication No. 2001-211478 proposes a technique for alerting a user of a received e-mail message, during voice communication, via an LED. Accordingly, interruption of voice communication by a sound can be avoided.

However, since a mobile phone is necessarily positioned proximate to an ear of a user during voice communication, it is unlikely that an LED indication provided in the mobile phone is will be noticeable to the user. Consequently, there is a high probability that the user will not be aware of an e-mail alert.

The present invention has been made in view of the foregoing described circumstances, and its object is provide a technique for, in a communication terminal capable of receiving a mail alert during data communication, and promptly informing a user of reception of an important e-mail without interrupting an important voice communication.

To solve the problems discussed above, the present invention provides a communication terminal capable of receiving data addressed to a user thereof while the terminal is being used for voice communication, comprising: storing means for storing an importance level of a communication partner in association with an identifier of the communication partner; first obtaining means for obtaining an identifier of a voice communication partner; second obtaining means for obtaining an identifier of an e-mail sender; determining means for identifying importance levels of a voice communication partner and an e-mail sender on the basis of an identifier of the voice communication partner obtained by the first obtaining means, an identifier of the e-mail sender obtained by the second obtaining means, and contents of the storing means, and for determining which importance level is higher; and alerting means for informing, if the determining means determines that an importance level of a sender is higher than that of a voice communication partner, the user of the communication terminal of receipt of data.

Also, the present invention provides a program for causing a computer capable of receiving data addressed to a user thereof, while the computer is being used for voice communication, to function as: storing means for storing an importance level of a communication partner in association with an identifier of the communication partner; first obtaining means for obtaining an identifier of a voice communication partner; second obtaining means for obtaining an identifier of an e-mail sender; determining means for identifying importance levels of a voice communication partner and an e-mail sender on the basis of an identifier of the voice communication partner obtained by the first obtaining means, an identifier of the e-mail sender obtained by the second obtaining means, and contents of the storing means, and for determining which importance level is higher; and alerting means for informing, if the determining means determines that an importance level of a sender is higher than that of a voice communication partner, the user of the communication terminal of receipt of data.

In the present invention, if a communication terminal receives a mail alert while being used for voice communication, the communication terminal obtains an identifier for uniquely identifying the voice communication partner and an identifier for uniquely identifying the sender of the e-mail. The communication terminal determines which one is more important, and, if the sender of the e-mail is determined to be more important, the communication terminal informs the user that it has received the mail alert.

In the present invention, if an e-mail is sent to a user of a communication terminal while the terminal is being used for voice communication, informing the user of an alert of the e-mail is controlled.

BRIEF DESCRIPTION OF THE DRAWINGS

FIG. 2 is a diagram showing an example of subscriber data stored in a subscriber database according to the embodiment.

FIG. 6 is a diagram showing an example of data stored in the address book table.

FIG. 11 is a diagram showing an example of the format of an address book table according to a modification of the present invention.

FIG. 12 is a diagram showing an example of the format of an address book table according to a modification of the present invention.

DESCRIPTION OF PREFERRED EMBODIMENT

Description will now be made of a preferred embodiment of the present invention with reference to the attached drawings.

1. Configuration of Embodiment

1-1. Entire Configuration

Figure 1:
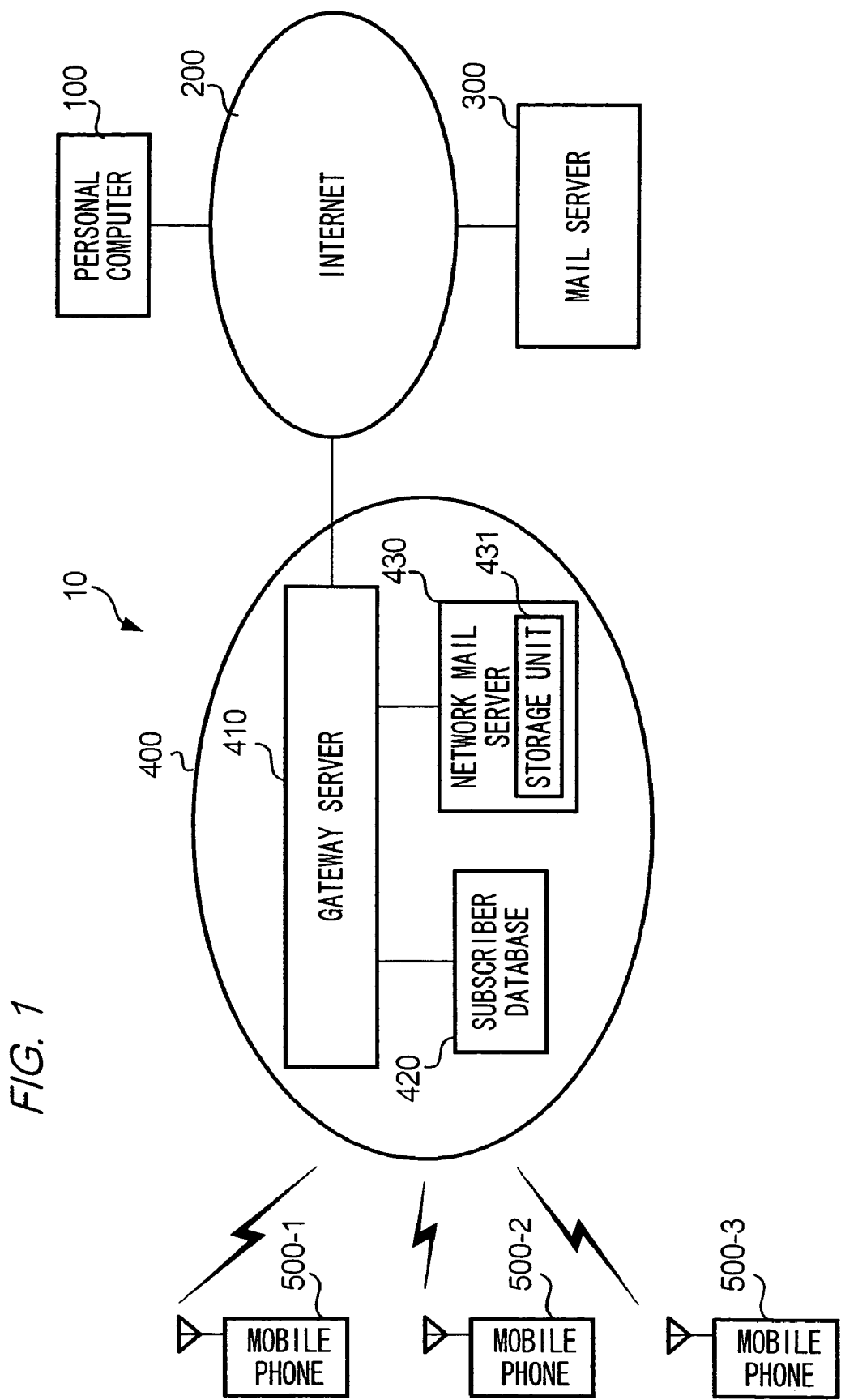
FIG. 1 is a block diagram showing an example of the entire configuration of a communication system according to an embodiment of the present invention.

FIG. 1 is a diagram showing an example of the entire configuration of communication system 10 according to one embodiment of the present invention. For simplicity of the drawing, communication system 10 as shown in FIG. 1 comprises only mobile phones 500-1 to 500-3, single mail server 300, and single PC 100. However, communication system 10 may comprise a large number of mobile phones, mail servers, and personal computers (hereinafter referred to as "PC").

PC 100 is a standard desktop computer connected to the Internet 200. PC 100 has a packet communication function and an e-mail exchange function, and exchanges e-mails by using SMTP (Simple Mail Transfer Protocol) and POP (Post Office Protocol). PC 100 stores an e-mail address "shiro@xyz.co.jp" assigned to a user of PC 100.

Mail server 300 has the same components as those of a commonly used server such as a CPU (Central Processing Unit), a ROM (Read Only Memory), a RAM (Random Access Memory), a storage unit, a communication interface (none of which is shown). Mail server 300 is connected to the Internet 200 and its domain name is "xyz.co.jp". Mail server 300 has a function of sending an e-mail received from PC 100 to a mail server designated by the domain name of the destination e-mail address. Also, mail server 300 has a function of storing e-mails addressed to an e-mail address assigned to a user of PC 100, and sending the stored e-mails to PC 100 upon request from PC 100.

Mobile communication network 400 is a communication network which adheres to IMT-2000 and employs W-CDMA (Wideband Code Division Multiple Access) as a communication technology. Mobile communication network 400 provides a voice communication service, a data packet communication service, and a multi-call service to a mobile phone of a user who is under contract with a communication carrier operating mobile communication network 400. Mobile communication network 400 comprises a wireless base station which wirelessly communicates with a mobile phone, a switching device connected with the wireless base station, a gateway switching device connected with the switching device and a public switched telephone network (none of which is shown), gateway server 410 connected with the switching device and the public switched telephone network, subscriber database 420, and mail server 430 (hereinafter, referred to as "in-network mail server 430"). Mobile communication network 400 relays e-mails in packet communication between a mobile phone and a communication terminal which is capable of e-mail exchanges and which is connected with the Internet 200.

Mobile phones 500-1 to 500-3 (each hereinafter referred to as "mobile phone 500", except where it is necessary to specify otherwise) are owned by users (not shown) and receive a variety of communication services provided by mobile communication network 400. Mobile phone 500 adheres to IMT-2000 and employs W-CDMA as mobile communication network 400 does, and has a multi-call function of performing data communication during voice communication.

1-2. Configuration of Personal Computer

PC 100 comprises a CPU for controlling components of PC 100, a ROM storing a BIOS (Basic Input Output System) used for checking whether components of PC 100 work properly and initializing them, and a RAM used as a work area for the CPU (none of which is shown). Also, PC 100 comprises an operation unit such as a mouse or a keyboard, a hard disk storing an OS (Operating System) program and an e-mail program used for exchanging e-mails, a display unit including a liquid crystal display and a driving circuit therefor, and a communication interface for communication over the Internet (none of which is shown).

When PC 100 is turned on by a user, the CPU reads the BIOS from the ROM and executes it to perform operation checks and initialization of components of PC 100. When the initialization is completed, the CPU reads the OS program from the hard disk and executes it. After the OS program is executed, an instruction by the user is identified on the basis of manipulation by the user of a mouse or a keyboard and a screen displayed on the display unit, and an operation corresponding to the instruction is performed.

When the user instructs execution of the e-mail program using the operation unit, the CPU reads the e-mail program from the hard disk and executes it. While the e-mail program is running, if the user inputs from the operation unit an instruction to the running e-mail program, the instruction by the user is identified on the basis of the manipulation by the user of the operation unit and a screen displayed on the display unit, and an operation corresponding to the instruction is performed. The e-mail program is for exchanging e-mails by using SMTP and POP, and if the user instructs an exchange of e-mails using the operation unit, PC 100 performs accordingly using SMTP and POP.

1-3. Configuration of Mobile Communication Network

1-3-1. Gateway Server

Gateway server 410 interconnects the Internet 200 and mobile communication network 400, and performs protocol conversions between the networks using different protocols. Specifically, when a packet communication is made between the Internet 200 and mobile communication network 400, gateway server 410 converts a protocol used in mobile communication network 400 and TCP/IP used in the Internet 200, or vice versa.

1-3-2. Subscriber Database

Subscriber database 420 is a database for storing data on subscribers being under contract with the communication carrier operating mobile communication network 400, and is connected with gateway server 410. As shown in FIG. 2, subscriber database 420 stores, in association with the name of a subscriber, subscriber data such as the terminal identifier for identifying mobile phone 500 of the subscriber, the telephone number thereof, the address thereof, and the e-mail address assigned to the subscriber by the communication carrier operating mobile communication network 400.

1-3-3. In-network Mail Server

In-network mail server 430 has the same components as those of a commonly used server, and is connected with gateway server 410. In-network mail server 430 comprises storage unit 431 as shown in FIG. 1, and the domain name of in-network mail server 430 is "abc.co.jp".

Storage unit 431 is a storage device for storing data permanently such as a hard disk, and has mailboxes for storing e-mails at each e-mail address.

In-network mail server 430 has a function of sending an e-mail sent from mobile phone 500 to a mail server designated by the domain name of the destination e-mail address thereof. Also, in-network mail server 430 has a function of storing in a mailbox an e-mail addressed to the e-mail address assigned to a user of mobile phone 500, a function of sending a mail alert to mobile phone 500 for informing the user that the e-mail has been stored in the mailbox, and a function of sending the stored e-mail to mobile phone 500 upon request from mobile phone 500.

In-network mail server 430, when receiving an e-mail, extracts from the e-mail the destination e-mail address thereof, and refers to the domain name of the extracted e-mail address. If the domain name is determined not to be the domain name of in-network mail server 430, it sends the e-mail to a mail server designated by the domain name.

If the domain name is determined to be the domain name of in-network mail server 430, it stores the e-mail in a mailbox designated by the e-mail address. Subsequently, in-network mail server 430 extracts the source e-mail address from the stored e-mail and prepares a mail alert for informing a user to which the destination e-mail address is assigned that an e-mail has been stored in the mailbox. This mail alert contains the extracted source e-mail address.

After preparing the mail alert, to identify mobile phone 500 to which the mail alert is to be sent, in-network mail server 430 searches subscriber database 420 using the destination e-mail address as a search key. If the destination e-mail address is found in subscriber database 420, in-network mail server 430 reads from the database the terminal identifier for identifying mobile phone 500 stored in association with the destination e-mail address. Subsequently, in-network mail server 430 sends to mobile phone 500 identified by the terminal identifier, the prepared mail alert.

1-4. Configuration of Mobile Phone

Figure 3:
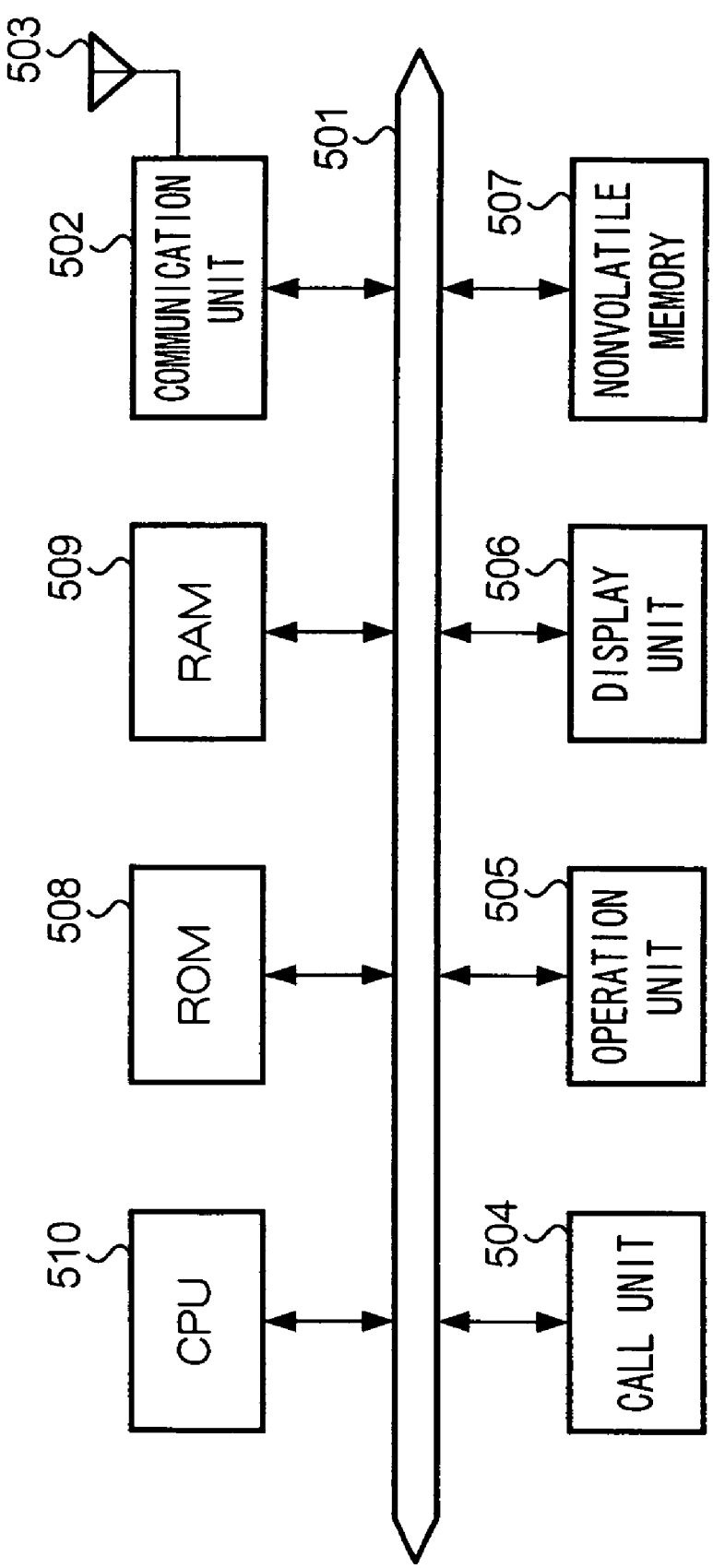
FIG. 3 is a block diagram showing an example of the hardware configuration of a mobile phone according to the embodiment.

FIG. 3 is a block diagram showing an example of the hardware configuration of mobile phone 500. As shown in FIG. 3, units of mobile phone 500 other than antenna 503 are connected with bus 501, and exchange data via bus 501.

Communication unit 502 functions as a communication interface, and, under control of CPU 510, wirelessly communicates with a wireless base station in mobile communication network 400 via antenna 503 which is connected to communication unit 502. Communication unit 502 is capable of performing voice communication and data communication simultaneously, and exchanges digital voice signals or data for data communication. Communication unit 502, when receiving digital voice signals or data from a wireless base station, outputs the former to call unit 504 and the latter to CPU 510. Communication unit 502, when data is input thereto from CPU 510, sends the data to a wireless base station. Communication unit 502, when digital voice signals are input thereto from call unit 504, sends the input signals to a wireless base station.

Call unit 504 comprises a microphone and a speaker (neither of which is shown). When a user speaks into the microphone, call unit 504 converts the voice communication to digital voice signals and outputs them to communication unit 502. Call unit 504, when digital voice signals are input thereto from communication unit 502, converts the digital voice signals to analog signals and outputs them to the speaker.

Operation unit 505 comprises a plurality of operation keys (not shown) for enabling a user to perform various input operations. When operation unit 505 is operated by a user, data corresponding to the operation is output from operation unit 505 to CPU 510. Display unit 506 comprises a liquid crystal display and a driving circuit therefor (neither of which is shown), and, under control of CPU 510, displays texts, a graphics screen, and a menu screen for operating mobile phone 500, on the liquid crystal display.

Nonvolatile memory 507 stores data for controlling mobile phone 500 and an address book table storing telephone numbers and e-mail addresses of persons with whom a user of mobile phone 500 carries out voice communication or exchanges e-mails. Also, nonvolatile memory 507 stores an e-mail address assigned to a user of mobile phone 500.

ROM 508 stores a variety of programs executed by CPU 510 such as an IPL (Initial Program Loader), an initialization program for initializing components of mobile phone 500, an OS program for controlling mobile phone 500, an e-mail program for exchanging e-mails, and an address book program for storing a telephone number and an e-mail address in association with a name. RAM 509 is used as a work area for CPU 510 and temporarily data used for a program executed by CPU 510.

CPU 510 controls components of mobile phone 500. When mobile phone 500 is turned on, CPU 510 reads the IPL from ROM 508 and executes it. Subsequently, CPU 510 reads the initialization program from ROM 508 and executes it, and thereby initializes CPU 510 and components of mobile phone 500. After the execution of the initialization program, CPU 510 reads the OS program from ROM 508 and executes it.

CPU 510 running the OS program performs an operation corresponding to an input signal. For example, if a user of mobile phone 500 inputs an instruction via operation unit 505, CPU 510 running the OS program identifies an instruction by the user on the basis of a signal output from operation unit 505 corresponding to the instruction input by the user and a screen displayed on display unit 506, and performs an operation corresponding to the instruction. CPU 510, if data output from communication unit 502 is input thereto, performs an operation corresponding to the input data.

1-4-1. Operations at Start of Voice Communication

Mobile phone 500 has a function of storing, at the start of voice communication, a telephone number of a person with whom a user of mobile phone 500 makes voice communication.

When a user of mobile phone 500 inputs, from operation unit 505, a telephone number of a voice communication partner and an instruction to start voice communication, CPU 510 running the OS program causes communication unit 502 to call the telephone of the person to which the input telephone number is assigned. When the call is made, CPU 510 stores the input telephone number in RAM 509.

If the user of mobile phone 500 starts voice communication in response to a call from another mobile or land phone, CPU 510 running the OS program obtains, using a caller ID service provided by mobile communication network 400, the telephone number assigned to the person having the source phone, and stores the obtained telephone number in RAM 509.

1-4-2. Function of Setting Importance Level

The address book program stored in ROM 508 is used for storing a telephone number and an e-mail address in association with a name in the address book table stored in nonvolatile memory 507. Also, the address book program is used for setting an importance level of a person designated by a telephone number or an e-mail address, and for storing the set importance level in association with a name, a telephone number, and an e-mail address.

Figure 4:
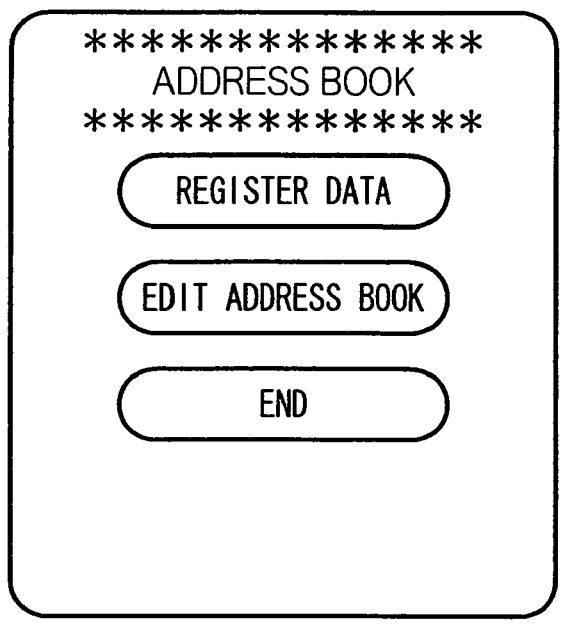
FIG. 4 is a diagram showing an example of a screen displayed when an address book program is executed.

FIG. 4 is a diagram showing an example of a screen displayed on display unit 506 when the address book program is executed. If a user of mobile phone 500 selects the "Register Data" icon displayed on the screen of FIG. 4, a screen for registering data as shown in FIG. 5 is displayed on display unit 506 of mobile phone 500.

Figure 5:
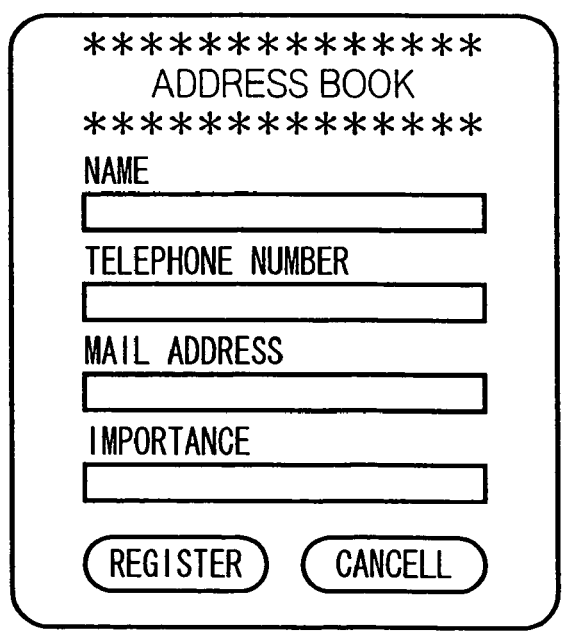
FIG. 5 is a diagram showing an example of a screen for registering data in an address book table displayed when the address book program is executed.

When the user of mobile phone 500 enters data in text box for name BX1, text box for telephone number BX2, and text box for e-mail address BX3 displayed on the screen of FIG. 5, the entered data is displayed in each of the text boxes. When the user of mobile phone 500 enters a number indicating an importance level in text box for importance level BX4, the entered number is displayed in text box for importance level BX4. The higher a number is, the higher the importance level.

When the user of mobile phone 500 selects the "Register" icon displayed on the screen for registering data, the data entered in the text boxes are associated with each other and stored in the address book table stored in nonvolatile memory 507. Specifically, as shown in FIG. 6, the data entered in text box for name BX1 is stored in a cell of name field F1. The data entered in text box for telephone number BX2 is stored in a cell of telephone number field F2. The data entered in text box for e-mail address BX3 is stored in a cell of e-mail address field F3. The data entered in text box for importance level is stored in a cell of importance level field F4.

1-4-3. Operations after Receipt of Mail alert

Figure 7:
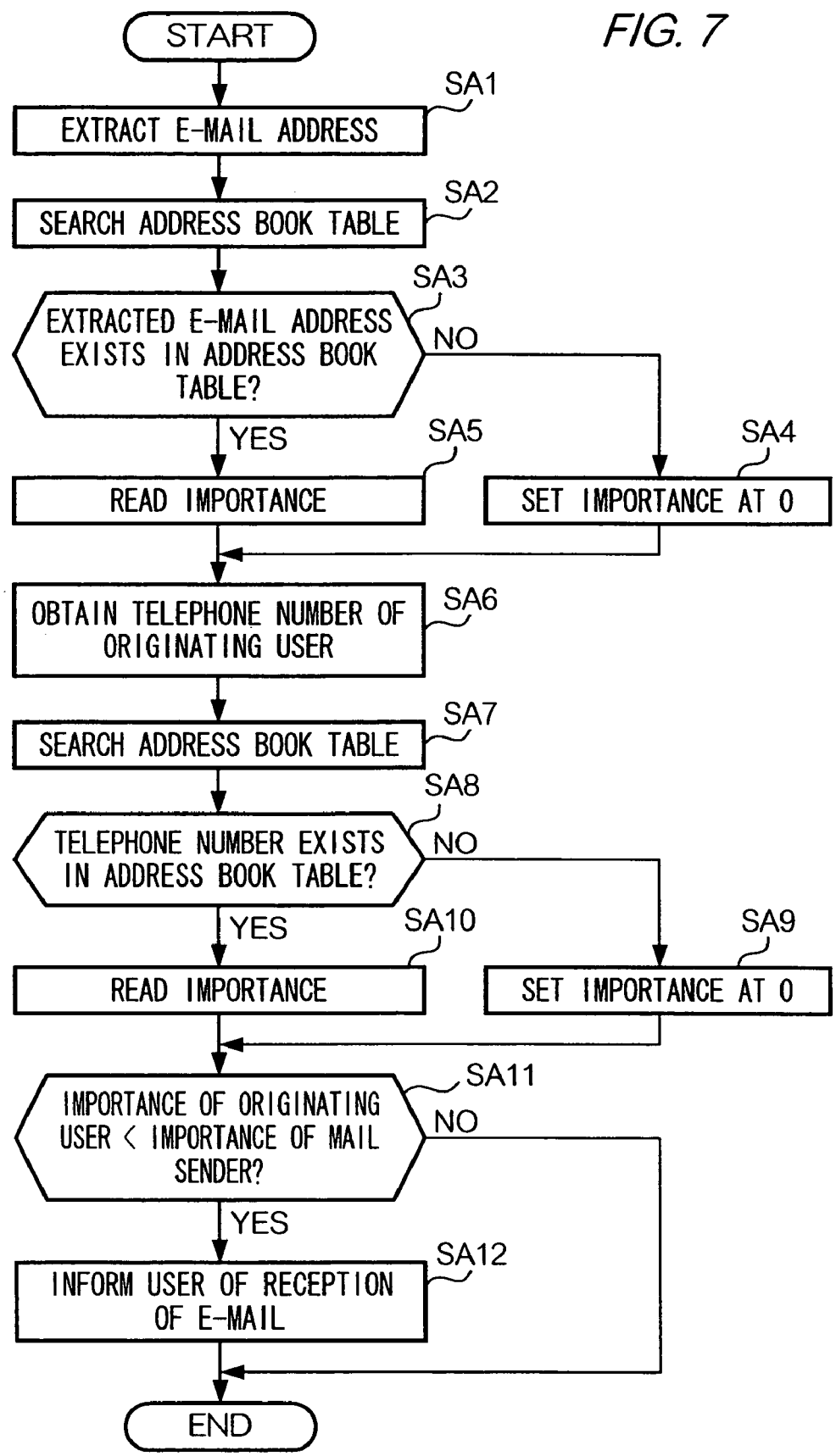
FIG. 7 is a flowchart illustrating operations which the mobile phone according to the embodiment performs on receipt of a mail alert while used for a telephone conversation.

Description will be made with reference to FIG. 7 of operations which mobile phone 500 performs on receipt of a mail alert while used for a telephone conversation.

CPU 510 running the OS program, when receiving a mail alert, extracts an e-mail address contained therein which is an e-mail address of an e-mail sender (Step SA1). Subsequently, to determine whether the extracted e-mail address is stored in the address book table stored in nonvolatile memory 507, CPU 510 searches the address book table (Step SA2). If the extracted e-mail address is not found in the address book table (Step SA3; NO), CPU 510 sets at 0 an importance level of the e-mail sender (Step SA4).

If the extracted e-mail address is found in the address book table (Step SA3; YES), CPU 510 reads an importance level stored in association with the found e-mail address (Step SA5).

Subsequently, CPU 510 obtains the telephone number of the voice communication partner. Specifically, if the voice communication has been started by a call from the user of mobile phone 500, CPU 510 reads the telephone number of the voice communication partner from RAM 509 which was stored in RAM 509 when the call was made. If the voice communication was started by the user of mobile phone 500 in response to a call from a mobile or land phone of the voice communication partner, CPU 510 reads the telephone number thereof, which was obtained using the caller ID service provided by mobile communication network 400 and has been stored in RAM 509 (Step SA6).

Subsequently, to determine whether the telephone number read from RAM 509 is stored in the address book table, CPU 510 searches the address book table (Step SA7). If the telephone number is not found in the address book table (Step SA8; NO), CPU 510 sets at 0 which is the lowest importance level of the voice communication partner (Step SA9). If the telephone number is found in the address book table (Step SA8; YES), CPU 510 reads from the address book table an importance level stored in association with the found telephone number (Step SA 10).

Subsequently, CPU 510 compares the importance level of the voice communication partner with the importance level of the sender of the e-mail, and thereby determines which one is more important (Step SA11).

If it is determined that the importance level of the voice communication partner is lower than the importance level of the sender of the e-mail (Step SA11; YES), CPU 510 causes call unit 504 to inform the user with a sound from the speaker that the mail alert has been received, and ends operations. If it is determined that the importance level of the voice communication partner is higher than the importance level of the e-mail sender (Step SA11; NO), CPU 510 ends operations without informing the user that the mail alert has been received.

As described above, mobile phone 500 has a function of controlling, if a mail alert is received while used for voice communication, informing a user thereof that it has received the mail alert.

1-4-4. E-mail Exchange Function

The e-mail program stored in ROM 508 is used for exchanging e-mails.

Figure 8:
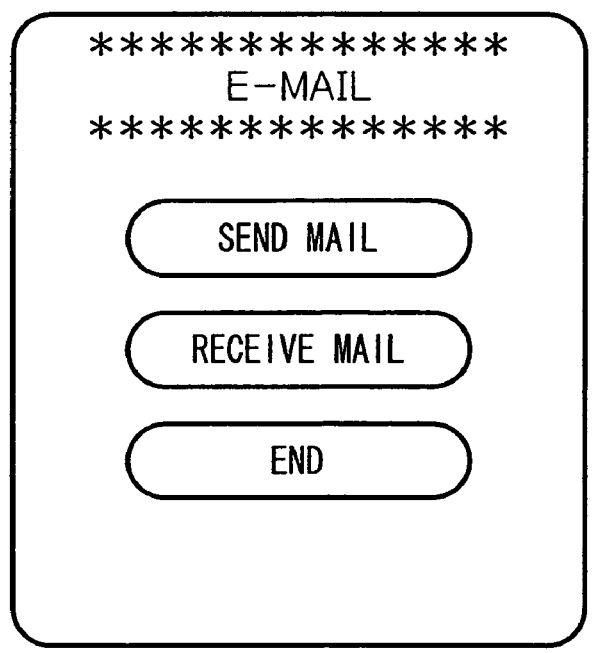
FIG. 8 is a diagram showing an example of a screen displayed when an e-mail program is executed in the mobile phone according to the embodiment.
Figure 9:
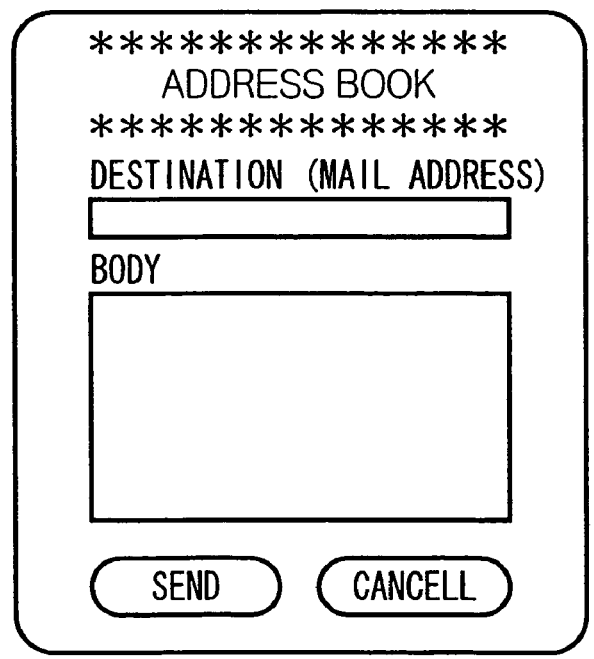
FIG. 9 is a diagram showing an example of a screen for creating an e-mail displayed when the e-mail program is executed.

When the e-mail program is executed by CPU 510, display unit 506 is caused to display thereon a menu screen as shown in FIG. 8. When a user of mobile phone 500 clicks the "Send Mail" button using operation unit 505, a screen as shown in FIG. 9 is displayed. When the user of mobile phone 500 enters a destination e-mail address and a message body of an e-mail using operation unit 505, CPU 510 temporarily stores the entered e-mail address and message body in RAM 509, and causes display unit 506 to display them on the liquid crystal display of display unit 506.

When the user of mobile phone 500 selects the "Send" icon displayed on the screen of FIG. 9, CPU 510 creates an e-mail containing the message body and the e-mail address which have been stored in RAM 509 temporarily, and an e-mail address assigned to the user of mobile phone 500 stored in nonvolatile memory 507, and causes communication unit 502 to send the created e-mail.

When the user of mobile phone 500 selects the "Receive Mail" icon displayed on the screen of FIG. 8 using operation unit 505, CPU 510 generates an e-mail request for obtaining an e-mail stored in a mailbox of in-network mail server 430 and causes communication unit 502 to send it.

CPU 510, when receiving the e-mail from in-network mail server 430 as a response to the e-mail request, stores the received e-mail in nonvolatile memory 507 and causes display unit 506 to display the message body of the e-mail.

2. Operations

Figure 10:
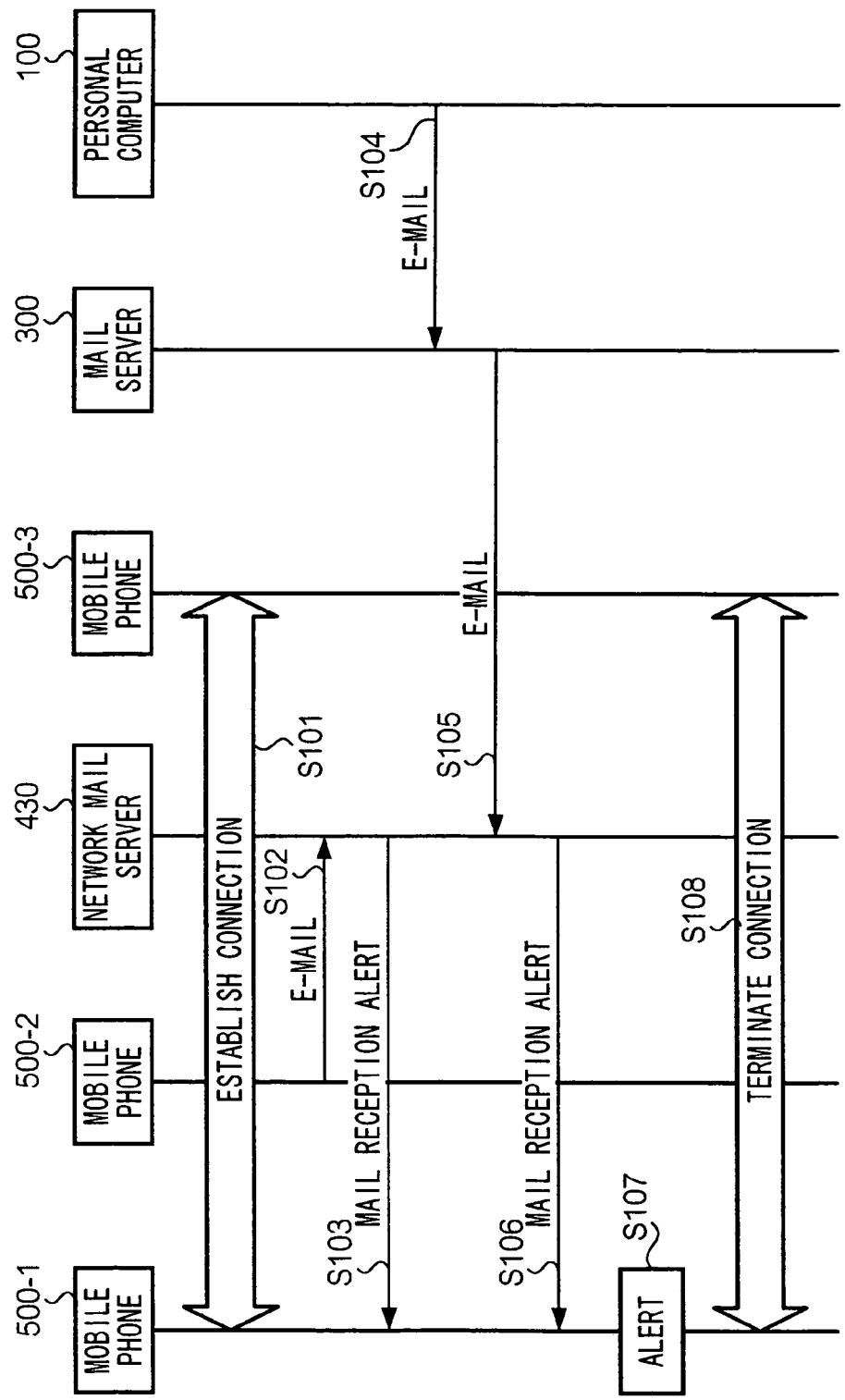
FIG. 10 is an operational sequence diagram showing an example of operations of the embodiment.

Description will be made with reference to FIG. 10 of operations performed when a user of mobile phone 500-1 receives a mail alert during a telephone conversation.

In this example, it is assumed that an address book table stored in mobile phone 500-1 stores data as shown in FIG. 6. Also, it is assumed that in mobile phone 500-2 and PC 100 an e-mail program is already executed and a screen for sending an e-mail is already displayed.

When the user of mobile phone 500-1 inputs from operation unit 505 a telephone number "0*0-5555-6666" assigned to a user of mobile phone 500-3, together with an instruction to start a call, signals corresponding to the input operations are output from operation unit 505 to CPU 510. CPU 510, when the signals are input thereto, causes communication unit 502 to call mobile phone 500-3 identified by the telephone number "0*0-5555-6666", and stores the telephone number "0*0-5555-6666" in RAM 509.

When the call is made by mobile phone 500-1, a call alert is sent from mobile communication network 400 to mobile phone 500-3. When mobile phone 500-3 receives the call alert, CPU 510 thereof causes call unit 504 to produce a telephone call. When, in response to the telephone call, the user of mobile phone 500-3 inputs from operation unit 505 an instruction to start voice communication, CPU 510 generates a call response signal and sends it to mobile communication network 400.

Mobile communication network 400, when receiving the call response signal, sends the received call response signal to mobile phone 500-1. When the call response signal is received by mobile phone 500-1, mobile phones 500-1 and 500-3 are connected and voice communication is started (Step S101).

When a user of mobile phone 500-2 inputs messages to the user of mobile phone 500-1, using operation unit 505, in a text box for a message body displayed on the screen of FIG. 9, and inputs an e-mail address "ichiro@abc.co.jp" assigned to the user of mobile phone 500-1 in a text box for the destination, the input texts are displayed on display unit 506 of mobile phone 500-2.

Subsequently, when the user of mobile phone 500-2 selects a "Send" icon displayed on the screen of FIG. 9 using operation unit 505, a signal corresponding to the operation is output from operation unit 505 to CPU 510. CPU 510, when the signal is input thereto, creates an e-mail containing the message body, the e-mail address designated as the destination, and an e-mail address stored in nonvolatile memory 507 and assigned to the user of mobile phone 500-2. The created e-mail is sent to in-network mail server 430 via a wireless base station, a switching device, and gateway server 410 provided in mobile communication network 400 (Step S102).

In-network mail server 430, when receiving the e-mail sent from mail server 300, extracts from the e-mail the destination e-mail address "ichiro@abc.co.jp" and refers to the domain name thereof. Since the extracted domain name "abc.co.jp" is the same as that of in-network mail server 430 "abc.co.jp", in-network mail server 430 stores the received e-mail in a mailbox identified by the extracted e-mail address.

In-network mail server 430, after storing the e-mail in the mailbox, generates a mail alert containing the e-mail address "jiro@abc.co.jp" of the sender of the e-mail.

In-network mail server 430, after generating the mail alert, to identify the destination thereof, searches subscriber database 420 using the destination e-mail address "ichiro@abc.co.jp" as a search key. When in-network mail server 430 finds the e-mail address from among data shown in FIG. 2, it reads from subscriber database 420 the terminal identifier "MS0001" for identifying mobile phone 500-1 stored in association with the e-mail address.

In-network mail server 430, after reading the terminal identifier from subscriber database 420, sends the generated mail alert to mobile phone 500-1 identified by the terminal identifier (Step S103). The mail alert sent from in-network mail server 430 is received by communication unit 502 of mobile phone 500-1 and output to CPU 510.

CPU 510 of mobile phone 500-1, after receiving the mail alert, extracts the sender e-mail address "jiro@abc.co.jp" and searches the address book table of nonvolatile memory 507 using the extracted e-mail address as a search key. If the e-mail address is found, CPU 510 reads an importance level stored in association with the e-mail address. The importance level of the person whose e-mail address is "jiro@abc.co jp" has been set at "3" by the user of mobile phone 500-1 as shown in FIG. 6, the number "3" is therefore read as the importance level.

Subsequently, CPU 510 reads the telephone number "0*0-5555-6666" of the voice communication partner, which has been stored in RAM 509 at the time of the call, and searches the address book table stored in nonvolatile memory 507 using the read telephone number as a search key. If the telephone number is found in the address book table, CPU 510 reads an importance level stored in association with the telephone number. The importance level of the person whose telephone number is "0*0-5555-6666" has been set at "4" by the user of mobile phone 500-1 as shown in FIG. 6; the number "4" is therefore read as the importance level.

CPU 510 compares the importance level of the voice communication partner with the importance level of the sender of the e-mail. Since the importance level of the voice communication partner is "4" and the importance level of the sender of the e-mail is "3", CPU 510 determines that the importance level of the voice communication partner is higher than that of the sender of the e-mail. As a result, CPU 510 determines that it should not inform the user of the reception of the mail alert during voice communication, and accordingly does not perform the alert.

When a user of PC 100 inputs, using an operation unit, messages to the user of mobile phone 500-1 and the e-mail address "ichiro@abc.co.jp" assigned thereto, and inputs an instruction to send an e-mail, an e-mail is sent from PC 100 to mail server 300 (Step S104).

Mail server 300, when receiving the e-mail sent from PC 100, refers to the domain name of the destination e-mail address "ichiro@abc.co.jp" and thereby determines the destination of the e-mail. Since the domain name of the destination e-mail address is "abc.co.jp", mail server 300 sends the e-mail to in-network mail server 430 whose domain name is "abc.co.jp" (Step S105).

In-network mail server 430, when receiving the e-mail sent from mobile phone 500-2, extracts from the e-mail the destination e-mail address "ichiro@abc.co.jp" and refers to the domain name thereof. Since the extracted domain name "abc.co.jp" is the same as that of in-network mail server 430 "abc.co.jp" in-network mail server 430 stores the received e-mail in a mailbox identified by the extracted e-mail address.

In-network mail server 430, after storing the e-mail in the mailbox, generates a mail alert containing the e-mail address "shiro@xyz.co.jp" of the sender of the e-mail.

In-network mail server 430, after generating the mail alert, to identify the destination thereof, searches subscriber database 420 using the destination e-mail address "ichiro@abc.co.jp" as a search key. When in-network mail server 430 finds the e-mail address from among data shown in FIG. 2, it reads from subscriber database 420 the terminal identifier "MS0001" for identifying mobile phone 500-1 stored in association with the e-mail address.

In-network mail server 430, after reading the terminal identifier from subscriber database 420, sends the generated mail alert to mobile phone 500-1 identified by the terminal identifier (Step S106). The mail alert sent from in-network mail server 430 is received by communication unit 502 of mobile phone 500-1 and output to CPU 510.

CPU 510 of mobile phone 500-1, after receiving the mail alert, extracts the sender e-mail address "shiro@xyz.co.jp" and searches the address book table of nonvolatile memory 507 using the extracted e-mail address as a search key. If the e-mail address is found, CPU 510 reads an importance level stored in association with the e-mail address. The importance level of the person whose e-mail address is "shiro@xyz.co.jp" has been set at "5" by the user of mobile phone 500-1 as shown in FIG. 6, the number "5" is therefore read as the importance level.

Subsequently, CPU 510 reads the telephone number "0*0-5555-6666" of the voice communication partner, which has been stored in RAM 509 at the time of the call, and searches the address book table stored in nonvolatile memory 507 using the read telephone number as a search key. If the telephone number is found in the address book table, CPU 510 reads an importance level stored in association with the telephone number. The importance level of the person whose telephone number is "0*0-5555-6666" has been set at "4" by the user of mobile phone 500-1 as shown in FIG. 6, the number "4" is therefore read as the importance level.

CPU 510 compares the importance level of the voice communication partner with the importance level of the sender of the e-mail. Since the importance level of the voice communication partner is "4" and the importance level of the sender of the e-mail is "5", CPU 510 determines that the importance level of the sender of the e-mail is higher than that of the voice communication partner. As a result, CPU 510 determines that it should inform the user of the reception of the mail alert during voice communication, and consequently causes call unit 504 to produce an alert to inform the user that the mail alert has been received (Step S107).

As described above, according to the present embodiment, if an e-mail is sent during voice communication from a person having a higher importance level than the voice communication partner, the reception of the e-mail is informed to the user by a ring alert during the voice communication. Consequently, the user of mobile phone 500 can know that an e-mail has been sent from a person important to the user even during voice communication. On the other hand, if the voice communication partner has a higher importance level than the sender of the e-mail, the reception of the e-mail is not informed to the user by a ring alert during the voice communication. Consequently, an important voice communication is not disturbed by a ring alert indicating receipt of a less important e-mail message.

3. Modifications

Mobile phone 500 of the above embodiment may be provided with time information obtaining means for obtaining time information or location information obtaining means for obtaining current location information of mobile phone 500. In this modification example, as shown in FIG. 11 or 12, an importance level field of an address book table is sectionalized by a time period or a location. According to this modification example, an importance level of a person with whom the user talks over the phone or a sender of an e-mail can be set for each time period or for each location of mobile phone 500.

In the above embodiment, an importance level may be stored in an address book table during a telephone conversation, instead of being stored in advance. In this modification example, when a user operates keys such as numeric keys during a telephone conversation, an importance level designated by the key operation is stored in an address book table in association with the telephone number.

In the above embodiment, an importance level of a voice communication partner, which has been set at low, may be raised temporarily using keys such as numeric keys during voice communication. According to this modification example, an importance level of a voice communication partner can be changed depending on the importance the user places on voice communication at the time it takes place.

In the above embodiment, if a reception of an e-mail is not informed to a user during voice communication, the reception of the e-mail may be informed to the user after the voice communication ends.

In the above embodiment, an address book table may be stored in-network mail server 430 instead of mobile phone 500. In this modification example, in-network mail server 430 determines whether mobile phone 500 to which a mail alert is to be sent is being used for voice communication, and if it is determined that mobile phone 500 is being used for voice communication, in-network mail server 430 obtains a telephone number of the voice communication partner. According to this modification example, in-network mail server 430 determines whether to send a mail alert by referring to the obtained telephone number, a received e-mail, and the address book table. Consequently, effects similar to those of the above embodiment can be achieved.

In the above embodiment, mobile phone 500 receives a mail alert. However, the present invention is not limited to the above embodiment. In recent years, between personal computers connected to the Internet, it has become possible to exchange voice data using VoIP (Voice over Internet Protocol) and thereby perform voice communication. The present invention may be applied to a personal computer performing voice communication using VoIP as well as a mobile phone.

In the above embodiment, mobile communication network 400 and mobile phone 500 may employ a communication technology other than IMT-2000. In essence, any communication technology which enables a multi-call service can be adapted.

In the above embodiment, programs executed by mobile phone 500 may be stored in a readable/writable memory such as a flash ROM instead of ROM 508. Alternatively, the programs executed by mobile phone 500 may be provided in mobile phone 500 via a storage medium such as a CD-ROM (Compact Disk Read Only Memory). In this modification example, the programs stored in a CD-ROM are once read by a personal computer having a CD-ROM drive, and by connecting the personal computer with mobile phone 500, the read programs are installed on mobile phone 500.

In the above embodiment, the terminal identifier and the e-mail address assigned to a user of mobile phone 500 may be stored in a UIM (User Identity Module) instead of ROM 508 and nonvolatile memory 507. This UIM is an IC card which is detachable from a mobile phone and stores subscriber data of a user of the mobile phone, and is used by a mobile phone using IMT-2000.

In the above embodiment, in-network mail server 430, after storing an e-mail in a mailbox, may send the e-mail itself to mobile phone 500 instead of a mail alert informing that the e-mail has been stored in the mailbox.

In the above embodiment, a human is assumed to be a voice communication partner and an e-mail source. However, the voice communication partner and the e-mail source are not limited to a human. A voice communication partner designated by a telephone number may be a telephone or computer having a telephone answering function, and a sender designated by an e-mail address may be a computer conducting a mailing list service.

What is claimed is:

1. A communication terminal comprising:
a memory;
a table stored in the memory and configured to store telephone numbers and e-mail addresses each in association with a respective priority level;
a communication interface configured to perform data communication during voice communication with a calling partner; and
a processor coupled with the communication interface and the memory, and configured to:
execute instructions stored in the memory to compare a priority level associated with an e-mail address of an e-mail sender and a priority level of a telephone number of a calling partner in response to receipt of indication of an email by the communication interface while a voice communication is in progress; and
execute instructions stored in the memory to generate an indication to inform a user of the communication terminal of receipt of the e-mail during the voice communication only if the priority level of the e-mail address of the e-mail sender is higher than the priority level associated with the telephone number of the calling partner.

2. The communication terminal of claim 1, wherein the table is sectionalized into a plurality of time periods each having a priority level of the e-mail address and a priority level associated with the telephone number, and the processor further configured to execute instructions to determine a current time and to compare the priority level of the e-mail address of the e-mail sender and the priority level associated with the telephone number of the calling partner in the one of the time periods that corresponds to the determined current time.

3. The communication terminal of claim 1, wherein the table is sectionalized into a plurality of locations each having a priority level of the e-mail address and a priority level associated with the telephone number, and the processor further configured to execute instructions to determine a current location of the communication terminal and to compare the priority level of the e-mail address of the e-mail sender and the priority level associated with the telephone number of the calling partner in the one of the locations that corresponds to the determined current location.

4. The communication terminal of claim 1, wherein the processor is further configured to execute instructions stored in the memory to temporarily adjust a priority level of the telephone number of a calling partner in response to receipt of a command from a user of the communication terminal while the voice communication is in progress.

5. The communication terminal of claim 1, wherein in response to completion of the voice communication the processor is further configured to execute instructions to generate an indication to inform a user of the communication terminal of previous receipt of the e-mail when the priority level of the e-mail address of the e-mail sender is lower than the priority level associated with the telephone number of the calling partner.

6. The communication terminal of claim 1, wherein a name of a respective individual other than the user of the communication terminal is stored in association with each of the respective email addresses and the telephone numbers, and the importance level is set for the respective individual.

7. The communication terminal of claim 1, wherein the processor is further configured to execute instructions stored in the memory to change the priority level of the e-mail address, or the priority level of associated with the telephone number during the voice communication in response to a user command.

8. A method of communicating with a communication terminal, the method comprising:
storing an identifier of a communication device in response to commencement of voice-based communication with the communication device;
monitoring for receipt of data messages during the voice-based communication;
extracting a sender identifier from a data message in response to receipt of the data message during the voice-based communication;
determining a first importance level of the received data message based on the extracted sender identifier, and a second importance level of the voice-based communication based on the identifier of the communication device;
comparing the first importance level to the second importance level; and
generating a sensory alert indicative of existence of the data message during the voice-based communication only when the first importance level is greater than the second importance level.

9. The method of claim 8, wherein the identifier of the communication device is a telephone number.

10. The method of claim 8, wherein the data message is an email message and the sender identifier is an email address of a sender of the email message.

11. The method of claim 8, wherein determining a first importance level comprises accessing an address book stored in a memory included in the communication terminal to extract an importance value that is stored in association with the identifier of the communication device.

12. The method of claim 8, wherein determining a first importance level comprises accessing an address book stored in a memory located external to the communication terminal to extract the importance value that is stored in association with the identifier of the communication device.

13. The method of claim 8, wherein determining a first importance level comprises accessing stored information to extract the first importance level stored in association with the sender identifier, and the second importance level stored in association with the identifier of the communication device.

14. The method of claim 13, wherein accessing stored information comprises assigning a default importance level for the first importance level or the second importance level when the respective sender identifier or the identifier of the communication device are unavailable for extraction.

15. The method of claim 8, wherein extracting a sender identifier comprises storing the data message, and sending an alert indicative of receipt and storage of the data message to the communication terminal, the alert including the extracted sender identifier.

16. The method of claim 8, comprising the initial steps of storing the first importance level in association with the identifier of the communication device and a name of a user of the communication device, storing the second importance level in association with the sender identifier and a name of a sender of the data message.

17. The method of claim 8, wherein determining a first importance level of the received data message based on the extracted sender identifier, and a second importance level of the voice-based communication based on the identifier of the communication device comprises determining a current time of day, and extracting the first importance level and the second importance level stored in association with a time period that includes the current time of day.

18. The method of claim 8, wherein determining a first importance level of the received data message based on the extracted sender identifier, and a second importance level of the voice-based communication based on the identifier of the communication device comprises determining a current geographic location of the communication terminal, and extracting the first importance level and the second importance level stored in association with a geographic location that is proximate to the current geographic location.

19. A communication terminal comprising:
a processor configured to execute instructions;
a memory in communication with the processor;
instructions stored in the memory that are executable by the processor to enable voice communication with another communication device;
instructions stored in the memory that are executable by the processor to enable email message communication during the voice communication;
instructions stored in the memory that are executable by the processor to obtain a first importance level associated with a received email message;
instructions stored in the memory that are executable by the processor to obtain a second importance level associated with the voice communication; and
instructions stored in the memory that are executable by the processor to generate a sensory alert indicative of receipt of the email message during the voice communication in response to the first importance level being greater than the second importance level.

20. The communication terminal of claim 19, further comprising instructions stored in the memory that are executable by the processor to generate a sensory alert indicative of receipt of the email message only when the voice communication is completed when the second importance level is greater than the first importance level.

21. The communication terminal of claim 19, further comprising a table accessible with the processor that is configured to store each of a plurality of importance levels in association with a unique identifier of the another communication device or a unique identifier of a sender of the email message, each of the importance levels storable in the table in response to commands by a user of the communication terminal.

22. The communication terminal of claim 21, wherein the table is configured with a plurality of selectable time periods, each associated with an importance level, and the communication terminal further comprises instructions stored in the memory that are executable by the processor to determine a current time, obtain from the table the first importance level that is associated with the received data message and a time period that corresponds to the current time, and obtain from the table the second importance level that is associated with the voice communication and a time period that corresponds to the current time.

23. The communication terminal of claim 21, wherein the table is configured with a plurality of selectable geographic locations, each associated with an importance level, and the communication terminal further comprises instructions stored in the memory that are executable by the processor to determine a current geographic location of the communication terminal, obtain from the table the first importance level that is associated with the received data message and the current geographic location, and obtain from the table the second importance level that is associated with the voice communication and the current geographic location.

24. The communication terminal of claim 19, further comprising instructions stored in the memory that are executable by the processor to transmit and receive email messages.

25. The communication terminal of claim 19, further comprising instructions stored in the memory that are executable by the processor to change a respective importance level of one of the voice communication or the email message during the voice communication.

26. The communication terminal of claim 19, further comprising instructions stored in the memory that are executable by the processor to store a respective importance level of one of the voice communication or the email message during voice communication.

27. The communication terminal of claim 19, further comprising instructions stored in the memory that are executable by the processor to obtain a predetermined default importance level for either the first importance level or the second importance level when a respective first importance level or a second importance level is not associated with the respective email message or the voice communication.

* * * * *